Patented Oct. 24, 1922.

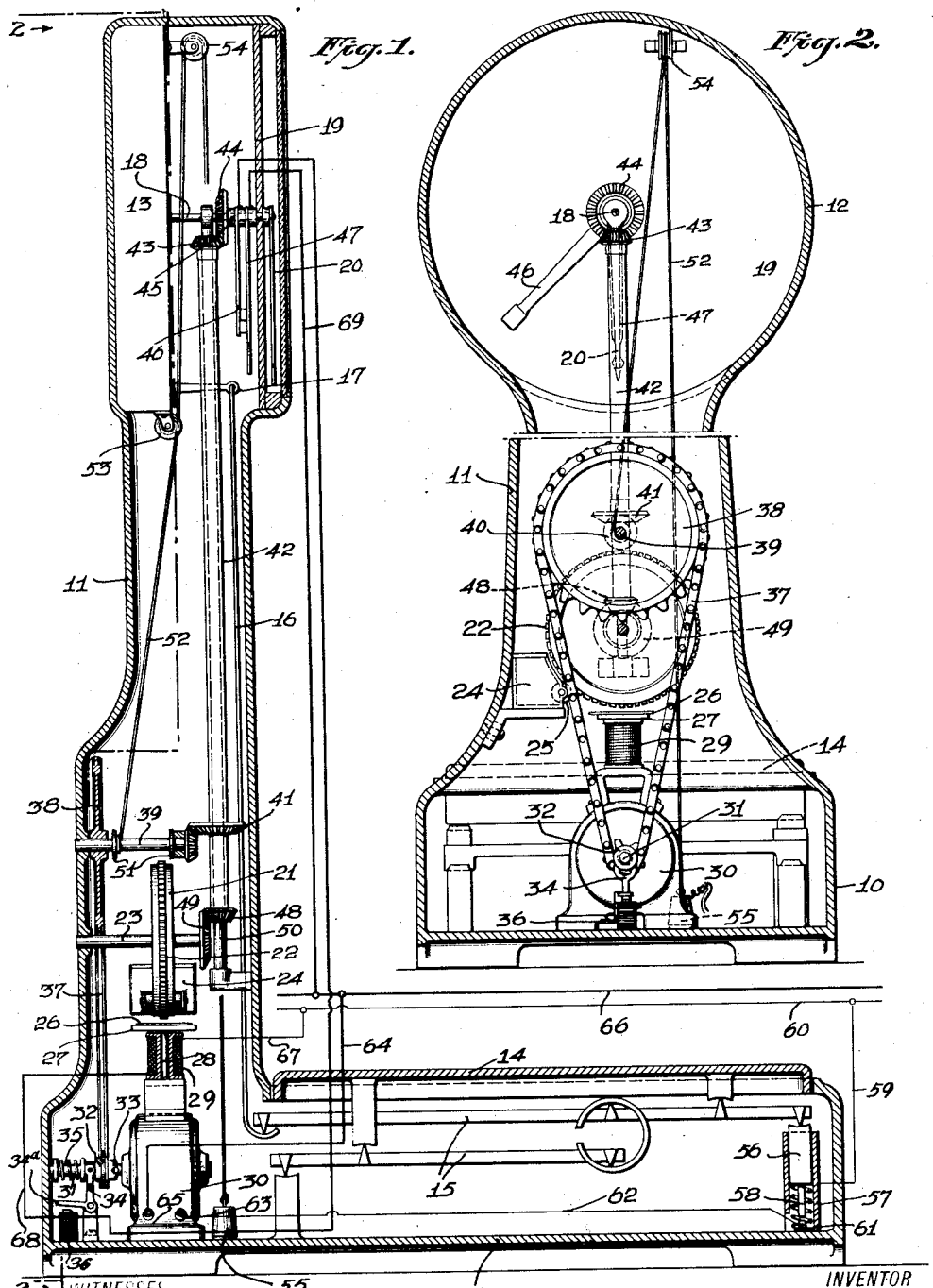

1,433,470

UNITED STATES PATENT OFFICE.

HERBERT NOBLE, OF BOSTON, MASSACHUSETTS.

AUTOMATIC PRINTING AND RECORDING MECHANISM FOR SCALES.

Application filed November 27, 1920. Serial No. 426,734.

*To all whom it may concern:*

Be it known that I, HERBERT NOBLE, a citizen of the United States, and a resident of Boston, in the county of Suffolk and State of Massachusetts, have invented a new and Improved Automatic Printing and Recording Mechanism for Scales, of which the following is a full, clear, and exact description.

This invention relates to scales or weighing apparatus and has particular relation to an automatic printing and recording mechanism therefor.

The invention contemplates the provision of a mechanism of the character set forth for automatically printing on a card or strip the correct weight of the article weighed by the scale.

The invention further contemplates mechanism for actuating the printing mechanism to cause the same to coincide with the weight indicated by the dial of the scale.

Another object of the invention resides in the provision of means for automatically setting the actuating means into operation upon the initial placement of the article to be weighed on the platform of the scale.

Another object of the invention resides in the provision of means for throwing the actuating mechanism out of operation when the printing mechanism has been operated to coincide with the weight shown by the indicating dial of the scale.

A still further object of the invention resides in the provision of means for returning the printing and actuating mechanisms to their normal positions upon the removal of the article from the scale platform.

A further aim of the invention is to provide an automatic printing and recording mechanism of the character described which is comparatively simple in construction, entirely automatic in its operation and highly efficient for the purpose for which it is intended.

With the above recited and other objects in view some of which will appear more clearly hereafter, reference is made to the following detailed description, the appended claims and the accompanying drawings forming a part of this application, in which;

Figure 1 is a transverse sectional view through a scale equipped with the automatic printing and recording mechanism and illustrating diagrammatically the wiring used in connection therewith.

Figure 2 is a transverse sectional view therethrough taken approximately on the line 2—2 of Figure 1.

Referring to the drawings by characters of reference, the scale housing is provided with a hollow base 10 having a hollow vertical standard 11 formed to provide the upper dial housing 12 in which is supported the weighing mechanism 13. As illustrated the scale is of the balance type and has the platform 14 mounted on the balance levers 15 for vertical movement in the base of the scale. The balance levers are connected by the vertical connection 16 to the actuating arm 17 of the weighing mechanism. The shaft 18 of the weighing mechanism extends through the dial 19 and has secured to its outer end the pointer or indicating arm 20 which is designed to move circumferentially over the dial to indicate the weight of an article placed upon the platform.

The printing mechanism includes a type drum 21 having the type 22 arranged on its outer periphery and said drum is mounted for rotary movement on a transverse shaft 23 supported within the standard 11 adjacent its lower end. The ink is distributed over the face of the type 22 from the ink reservoir 24 by a wiper roller 25 which contacts with the face of the type. The card or strip 26 upon which the weight indicia is printed, is supported by a vertically movable table 27 arranged directly below the printing drum and said table is supported by the core 28 of a solenoid 29 which operates when energized to project the table and card upwardly into contact with the type of the printing roll.

The actuating mechanism for revolving the printing drum to coincide with the weight indicated by the pointer 20, includes a motor 30 on the shaft 31 of which is loosely mounted a sprocket drive wheel 32 which is provided with clutch means 33 whereby the same may be coupled to the shaft 31 for rotation therewith. A shifting yoke 34, having a right angularly disposed arm 34ª normally actuated by a spring 35 to effect the coupling of the sprocket 32 with the shaft is controlled by an electromagnet 36 which when energized acts on the arm 34ª constituting its armature, to effect the movement thereof against said spring for disconnecting the clutch 33. The sprocket drive wheel 32 is connected by sprocket chain 37 to a driven sprocket wheel 38 keyed to a shaft 39. The opposite end of the shaft has keyed thereto a bevel gear 40 which meshes with a beveled pinion 41 secured to the vertical sleeve 42. The upper end of the sleeve 42 has secured thereto a beveled gear 43 which meshes with the beveled pinion 44 secured to a hollow shaft 45. A contact arm 46 is secured to the hollow shaft 45 and a second contact arm 47 is secured to and is movable with the shaft 18. The contact arm 47 is arranged parallel and in alignment with the pointer arm 20 whereby upon rotation of the shaft 18 the pointer 20 and said contact arm 47 will move simultaneously. The lower extremity of the sleeve 42 has secured thereto a beveled pinion 48 geared with a beveled pinion 49 on the drum shaft 23. The sleeve 42 is mounted for rotation on a vertical stationary shaft 50. From this arrangement, it will be seen that when the clutch 33 is engaged and the motor is in operation, the sleeve 42 will be driven thereby to effect rotations of the printing drum 21. The shaft 39 is provided with a pair of spaced annular flanges 51 to provide therebetween a drum to receive the convolutions of the cable 52 when the same is wound thereon. The cable 52 is connected at one end to the shaft and is trained over the guide pulleys 53 and 54. The opposite end of the cable is secured to a weight 55. The function of the cable and the weight is to normally retain the printing drum at zero and the contact arm 46 disposed approximately at a 45 degree angle whereby the same will be maintained substantially one eighth of a revolution behind the contact arm 47.

One of the balance levers 15 is carried by a vertically movable support 56 supported by an expansion spring 57. The support 56 is provided with a contact point 58 connected by a circuit wire 59 to a common feed wire 60. A second contact point 61 is connected by a circuit wire 62 to one of the binding posts 63 of the motor 30. A return wire 64 connects the motor through its binding post 65 to the opposite feed wire 66 of the supply circuit. The contact point 61 is disposed directly below the contact point 58 and normally said contact points are out of engagement. One terminal of the winding of the solenoid 29 is connected by the circuit wire 67 to the common feed wire 60 and the opposite terminal is connected in series by the circuit wire 68 through the electromagnet 36 to the contact arm 46. The contact arm 47 is connected by the circuit wire 69 to the feed wire 66.

In operation, when an article to be weighed, is placed on the platform 14, the weight of the same will initially effect engagement of the contact points 58 and 61 to energize and actuate the motor 30. As the motor shaft 31 rotates, the driving sprocket wheel 32 through the sprocket chain connection 37 will rotate the sprocket wheel 38 and shaft 39. At the same time the weight of the article will operate the balance levers and actuate the weighing mechanism 13 to rotate the pointer shaft 18. The pointer 20 will move circumferentially to indicate on the dial 19 the weight of the article. The rotation of the shaft 39 will simultaneously rotate the sleeve 42 through the engagement of the beveled gear and pinions 40 and 41. The rotation of the sleeve 42 will impart rotary movement to the type or printing drum 21 through the engagement of the beveled gear and pinion 48 and 49. Simultaneously the engagement of the beveled gear 43 and pinion 44 will rotate the sleeve 45 and effect circumferential movement of the contact arm 46 until said contact arm 46 catches up with the contact arm 47 and engages the same. Immediately upon the engagement of the contact arms 46 and 47, the secondary circuit will be closed to energize the solenoid 29 and electromagnet 36. This will effect an upward movement of the table 27 to bring the card or strip 26 into contact with the face of the type on the drum which is timed and geared in such a manner as to bring the type corresponding to the weight indicated by the pointer into register with the table. At the same time the electromagnet 36 will attract the arm 34ᵃ to throw the shifting fork 34 to the left for disconnecting the clutch 33 resulting in an immediate arresting of further movement of the printing drum. In the meantime, the rotations of the shaft 39 will have wound a portion of the cable 52 thereon between the annular flanges 51 and it is obvious that upon releasing of the clutch members, the weight 55 will gravitate and effect retrograde movement of the shaft 39 to return the drum, and the contact arm 46 to normal position. When the article is removed from the platform 14, the engagement of the contact points 58 and 61 will be broken, thus throwing the motor out of operation and permitting the pointer 20 and contact arm 47 to return to their normal positions. It will thus be seen that there has been provided in combination with a scale an automatic mechanism for printing and recording the weight indicated by the pointer.

While there has been illustrated and described a single and preferred form of apparatus for carrying out the invention, it is to be understood that the right is reserved to embodiments other than those actually shown herein, to the full extent indicated by the general meaning of the terms in which the claims are expressed and by variations in the phraseology of the same.

I claim:

1. In combination, a scale including a weight indicating mechanism and means for printing the weight indicated by said indicating mechanism comprising a rotary type drum, a table for supporting and moving a card or strip against the type drum, means rendered initially operable by the weight of the article placed upon the scale platform for rotating the type drum, means for actuating the card or strip supporting table to move the same against the drum, and a common means for simultaneously discontinuing the rotation of the type drum and operating the table actuating means when the weighing operation is completed.

2. In combination with a scale including a platform and a weight indicating mechanism operatively connected thereto, of means for printing the weight indicated by the weight indicating mechanism including type corresponding to the various weights of the weight indicating mechanism, a card or strip supporting member, means rendered initially operable by the weight of the article placed upon the scale platform for selectively bringing the type into alignment with the card or strip supporting member, and a common means for simultaneously setting the type and moving the card or strip supporting table against the type upon the completion of the weighing operation, said latter means being rendered active by its coacting engagement with the weight indicating mechanism.

3. The combination with a scale including a platform and a weight indicating mechanism operatively connected thereto, of means for printing the weight indicated by the indicating mechanism on a card or strip comprising a rotary type drum, a table for supporting and moving the card or strip thereagainst, means rendered active initially by the weight of the article placed upon the scale platform for rotating the type drum, means adapted to coact with the weight indicating mechanism upon completion of the weighing operation for rendering the drum rotating means inactive when the type corresponding to the weight indicated is disposed opposite the card or strip supporting table, and means operable by said latter means for simultaneously effecting the movement of the ticket or card supporting table against the type drum.

4. The combination with a scale including a pointer for indicating the weight of an article placed thereon, of a rotary type drum, means for rotating the drum, means operable by the weight of an article placed on the scale for actuating the drum rotating means, a table movable into and out of contact with the type drum and adapted to support a card or strip upon which the weight is to be printed, means for simultaneously rendering the actuating means inactive and effecting the contact of the table with the drum when the type representing the weight indicated by the pointer coincides with the table.

5. The combination with a scale including a pointer for indicating the weight of an article placed thereon, of a rotary type drum, means for rotating said drum, means operable by the weight of an article placed on the scale, for actuating the drum rotating means, a table movable into and out of contact with the type drum and adapted to support a card or strip upon which the weight is to be printed, means for simultaneously rendering the actuating means inactive and effecting the contact of the table with the drum when the type representing the weight indicated by the pointer coincides with the table, and means for returning said parts to normal position when the printing operation is completed and the article is removed from the scale.

6. In combination, a scale having a pointer for indicating the weight of articles placed thereon, a rotary drum, a table movable into and out of contact therewith for receiving and supporting a card or strip upon which the weight indicia is printed, actuating means adapted when active to rotate the drum, means operable to render the actuating means inactive and effect contact of the table and drum when the type representing the weight indicated by the pointer coincides with the table, and means operable by the weight of an article placed on the scale for initially rendering said actuating means active.

7. In combination, a scale having a pointer for indicating the weight of articles placed thereon, a rotary drum, a table movable into and out of contact therewith for receiving and supporting a card or strip upon which the weight indicia is printed, actuating means adapted when active to rotate the drum, means operable to render the actuating means inactive and effect contact of the table and drum when the type representing the weight indicated by the pointer coincides with the table, and means for returning all of said parts to normal position when the printing operation is completed.

HERBERT NOBLE.